July 4, 1950 — R. R. KELLEY ET AL — 2,513,878

BUILT-IN-FLASH CALCULATOR FOR FLASH GUNS

Filed Sept. 29, 1947

INVENTORS
Robert R. Kelley &
Richard E. Schenck.
BY Victor J. Evans & Co.
ATTORNEYS Patented July 4, 1950

2,513,878

UNITED STATES PATENT OFFICE 2,513,878

BUILT-IN-FLASH CALCULATOR FOR FLASH GUNS

Robert R. Kelley and Richard E. Schenck, Hammond, Ind.

Application September 29, 1947, Serial No. 776,798

1 Claim. (Cl. 235—64.7)

This invention relates to a built in flash calculator.

It is an object of the present invention to provide a flash calculator adapted for use on a flash gun used by photographers where it will be readily available when needed to calculate by simple adjustment the film speed, the shutter speed, and the size of the opening under given light and distance conditions and for a given type of flash lamp.

Other objects of the present invention are to provide a flash calculator for photographers which is of simple construction, easy to operate and adjust, inexpensive to manufacture, compact and convenient to use.

Figure 1:
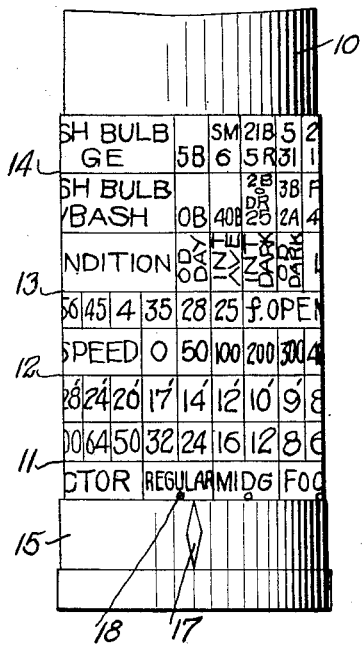
Figure 2:
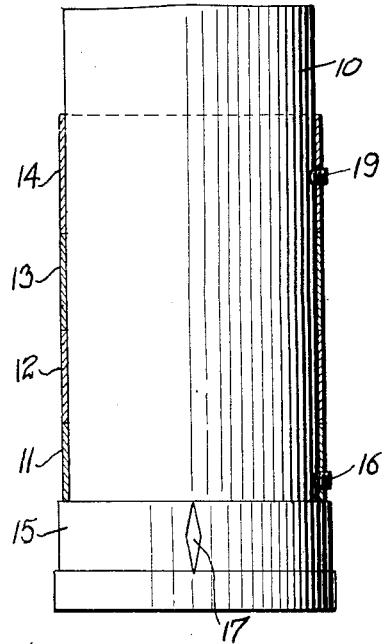
Figure 3:
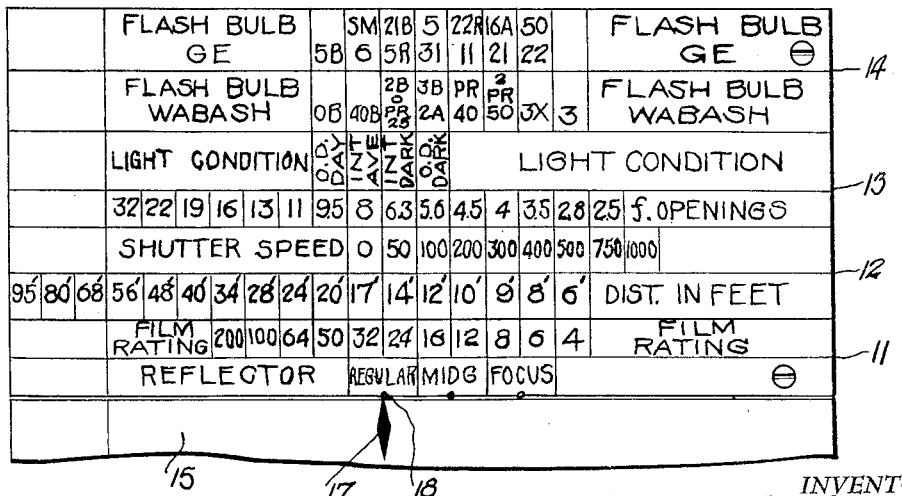

For a better understanding of the invention, reference may be had to the following detailed description taken in connection with the accompanying drawing, in which Figure 1 is a side elevational view of the calculator as arranged on a flash gun handle, Figure 2 is a fragmentary and cross-sectional view taken through the calculator rings, two of which are adjustable while the other two are fixed by set screws, Figure 3 is a developed view of the calculator rings showing the data contained thereon.

Referring now to the figures, 10 represents a portion of a flash gun as for instance the handle thereof which is of round section and on which are disposed four rings 11, 12, 13 and 14. The bottom ring 11 abuts a shoulder 15 and can be fixed in its adjusted position by a set screw 16. The indication of the location of the bottom ring 11 can be determined from an index 17 on the shoulder portion 15. The ring 11 bears data relating to the flash bulb reflector and the film to be used in the camera. If the reflector is of the regular type the ring 11 will be adjusted to a position shown in Figure 3 with the word regular and its center point 18 being aligned with the index 17.

The ring 12 is left free to be adjusted and bears data pertaining to the shutter speed and the distance in feet from the object.

The ring 13 is free to be rotated at all times and bears data pertaining to the condition of the light and the size of the camera opening.

Top ring 14 is fixed in place by a set screw 19 and bears data pertaining to two different types of flash bulbs. Thus of the four calculator rings only the center ones are movable.

The ring 13 is first adjusted until the light condition which is known is aligned with the type of flash bulb being used. Next, the ring 12 is adjusted until the desired distance to the object of which a picture is being taken is in line with the film rating or speed of the film being used. After having made these two adjustments the shutter speed and the opening in the camera can be readily read and the camera accordingly adjusted to correspond.

Assuming that a Wabash 2A bulb is being used and the light condition is out doors dark, the footage twenty-eight feet and film speed one hundred, the adjustment of the rings 12 and 13 will be made accordingly and the shutter and opening will be read from the two inner rings 12 and 13. The camera adjustments will be made for 6.3 opening with a shutter speed of one fiftieth of a second, or an opening of 5.6 with a shutter speed of one one-hundredth of a second and so forth. These operations have taken little time and inasmuch as they are an integral part of a flash gun handle the data information is readily and quickly made available to the photographer. Only two adjustments are required for the readings to be taken.

While various changes may be made in the detail construction, it shall be understood that such changes shall be within the spirit and scope of the present invention as defined by the appended claim.

We claim:

A flash calculator for photographers which is adapted to be mounted on a tubular member having an annular shoulder on one end thereof and having an index positioned thereon comprising two fixed elements and two movable elements, one of the fixed elements indicating the type of bulb being used, the other fixed element indicating the film speed and the type of reflector being used, and two adjustable elements, indicating the light condition, the size of camera opening, the shutter speed and the footage from the object, said fixed elements adapted to be moved in relation to the index on such tubular member and having means whereby said fixed elements are retained in fixed relation to said member, said movable elements being adjusted respectively with respect to the fixed elements so that corresponding opening size and shutter speed are determinable from the positions of the movable elements when the adjustment of the same has been effected in relation to the fixed elements.

ROBERT R. KELLEY.
RICHARD E. SCHENCK.

REFERENCES CITED

The following references are of record in the file of this patent:

UNITED STATES PATENTS

| Number | Name | Date |
|---|---|---|
| 456,869 | Watkins | July 28, 1891 |
| 1,864,180 | Bing | June 21, 1932 |

FOREIGN PATENTS

| Number | Country | Date |
|---|---|---|
| 2,166 | Great Britain | Jan. 31, 1895 |